United States Patent [19]

Bauer et al.

[11] 3,903,009

[45] Sept. 2, 1975

[54] AZEOTROPE OF 1,1,2-TRICHLORO-1,2,2-TRIFLUOROETHANE, ETHANOL AND NITROMETHANE

[75] Inventors: Albert Webb Bauer, Wilmington, Del.; James Gordon Burt, Oxford, Pa.

[73] Assignee: E. I. de Pont de Nemours and Company, Wilmington, Del.

[22] Filed: Nov. 16, 1973

[21] Appl. No.: 416,664

[52] U.S. Cl. .................... 252/171; 134/40; 252/67; 252/172; 252/364; 252/DIG. 9; 260/653

[51] Int. Cl.[2] .......................................... C23G 5/02

[58] Field of Search ........... 252/170, 171, 172, 153, 252/364, DIG. 9

[56] References Cited

UNITED STATES PATENTS

| | | | |
|---|---|---|---|
| 3,085,116 | 4/1963 | Kualnes | 260/652.5 |
| 3,355,391 | 11/1967 | Eisemann, Jr. | 252/153 |
| 3,573,213 | 3/1971 | Burt | 252/172 |
| 3,723,332 | 3/1973 | Barton | 252/171 |
| 3,728,268 | 4/1973 | Burt | 252/170 |
| 3,789,004 | 1/1974 | McMillan et al. | 252/171 |
| 3,789,006 | 1/1974 | McMillan et al. | 252/171 |

*Primary Examiner*—Benjamin R. Padgett
*Assistant Examiner*—Ralph Palo

[57] ABSTRACT

A minimum boiling point azeotrope containing about 95.3 percent 1,1,2-trichloro-1,2,2-trifluoroethane, 3.6 percent ethanol and 1.1 percent nitromethane by weight, useful for cleaning circuit boards.

1 Claim, No Drawings

AZEOTROPE OF 1,1,2-TRICHLORO-1,2,2-TRIFLUOROETHANE, ETHANOL AND NITROMETHANE

BACKGROUND OF THE INVENTION

Circuit boards, used in the electronics industry, consist of a plate of electrically resistant plastic, normally reinforced by glass fibers, having electrical connectors on one side thereof. The connectors are thin flat strips of conductive metal, usually copper, which serve to interconnect the electronic components attached to the opposite side of the circuit board. The electrical integrity of the contacts between the connectors and the components is assured by soldering.

Current industrial processes of soldering circuit boards involve coating the entire circuit side of the board with a flux and thereafter passing the coated side of the board through molten solder. The flux removes corrosion from the conductive metal parts and promotes adhesion of the solder. The preferred fluxes in this use consist for the most part of rosin, used alone or with activating additives such as an amine hydrochloride, trimethylamine hydrochloride, and oxalic acid additives. Rosin fluxes are often dissolved in solvents such as ethanol and ethylene glycol for convenient application to the boards.

After soldering, which thermally degrades part of the rosin, the flux is removed from the board by means of an organic solvent. While a wide variety of solvents has been suggested for this application, many that might be suitable attack the organic materials from which many circuit boards are made. Additionally, the use of many solvents for defluxing is undesirable because of their degree of flammability and toxicity. For these reasons less aggressive, nonflammable and nontoxic organic solvents have been sought.

1,1,2-Trichloro-1,2,2-trifluoroethane, although meeting flammability, toxicity and nonagressiveness requirements, does not exhibit adequate rosin solubility. To increase the ability of 1,1,2-trichloro-1,2,2-trifluoroethane to dissolve fresh and degraded flux, the addition of more active solvents such as the lower alcohols has been suggested. However, azeotropic mixtures of 1,1,2-trichloro-1,2,2-trifluoroethane and ethanol, for example, while having increased rosin solubility, can attack reactive metals such as zinc, aluminum, magnesium and beryllium. This limits the otherwise advantageous use of these active metals in circuit board assemblies which are to be cleaned with these mixtures. Accordingly, an entirely satisfactory defluxing solvent has previously not been available.

SUMMARY OF THE INVENTION

This invention provides a solvent suitable for defluxing applications which overcomes the deficiencies previously encountered.

Specifically there is provided a minimum boiling point azeotropic composition consisting essentially of about 95.3 weight percent 1,1,2-trichloro-1,2,2-trifluoroethane, about 3.6 weight percent ethanol, and about 1.1 weight percent nitromethane.

DETAILED DESCRIPTION OF THE INVENTION

The components of the present azeotropic composition are commercially available in substantially pure form. While it is preferable to have the components in substantially pure form, minor impurities will generally not adversely affect the performance of the azeotropes. For example, ethanol denatured with methanol can be used for the ethanol component. The composition of the invention can be prepared by combining and admixing the constituents in the specified proportions. Alternatively, the azeotropic composition can be isolated by distillation from mixtures of the components in proportions outside the azeotropic composition. If only the three components of the composition be present, then the fraction of minimum boiling point should be collected.

The composition of the invention is nonflammable in air under all conditions whereas compositions containing greater amounts of ethanol or nitromethane become flammable on evaporation. In addition, the present solvents inhibit the attack on active metals such as aluminum, zinc, magnesium and beryllium that would normally take place under anaerobic conditions such as those encountered in a vapor degreaser. This result is in contrast to combinations of ethanol and halogenated hydrocarbons, without nitromethane. Surprisingly, this advantage is realized with no depreciation and some improvement in the defluxing capability of the azeotrope.

The azeotropic compositions of the present invention are particularly well suited for the removal of rosin-based flux used in the preparation of circuit boards. Vapor degreasers are generally used to apply the solvent to the boards. In the conventional operation of a vapor degreaser, the board is passed through a sump of boiling solvent, which removes the bulk of the rosin, and thereafter through a sump containing freshly distilled solvent near room temperature, and finally through solvent vapors over the boiling sump which provides a final rinse with clean pure solvent which condenses on the circuit board. In addition, the board can also be sprayed with distilled solvent before final rinsing.

The azeotropic nature of the present compositions insures that adequate proportions of each component will be present at all stages in the operations of a vapor degreaser. By contrast, non-azeotropic compositions would, through the distillation process, exhibit increasingly divergent solvent compositions in the various stages, accompanied by the loss of the beneficial effect of the component reduced in concentration in the distillation process.

The invention is further illustrated by the following examples, in which percentages are by weight unless otherwise indicated.

EXAMPLE 1

An azeotropic composition was prepared by distillative isolation from a mixture of three components initially present in non-azeotropic proportions.

To the still pot of a fractional distillation device having an efficiency of about 100 theoretical plates at total reflux, was charged a mixture consisting of 97.85 wt. percent 1,1,2-trichloro-1,2,2-trifluoroethane, 1.55 wt. percent ethanol and 0.60 wt. percent nitromethane. This mixture contained only about 43 wt. percent and about 55 wt. percent respectively of ethanol and nitromethane required to form the azeotrope.

Distillation separated about 35 wt. percent of the total charge as the azeotrope of the invention. The azeotrope of boiling point 44.4°C. at 760 mm. Hg. was the fraction of lowest boiling point. Gas chromatographic analysis of the distillate fractions showed the azeotrope to consist of 95.3 wt. percent 1,1,2-trichloro-1,2,2-trifluoroethane, 3.6 wt. percent ethanol, and 1.1 wt. percent nitromethane.

EXAMPLE 2

An azeotropic mixture of 1,1,2-trichloro-1,2,2-trifluoroethane, ethanol, and nitromethane was prepared by admixing the components in the required proportions. Three other, non-azeotropic, mixtures were prepared.

A laboratory size vapor degreaser was used to evaluate the solvent compositions. The degreaser had a boil sump and a rinse sump. Vapors from the boil sump were condensed at the top of a vapor space above the sumps and the condensate was directed to the rinse sump. Overflow from the rinse sump passed over a weir on return to the boil sump. The sumps were of equal volume, each accommodating about 2.9 liters. The various mixtures were charged into both sumps and the degreaser was operated for eight hours. Thereafter the compositions in the two sumps were analyzed by gas chromatography.

The results are shown in the Table.

The marked changes in composition in the non-azeotropic mixtures render them unsuitable for use in a continuous defluxing operation in a vapor degreaser.

TABLE

| Example | Component | Compositions in Wt. % Starting Charge | Boil Sump (after 8 hrs.) | Rinse Sump (after 8 hrs.) |
|---|---|---|---|---|
| 2 | 1,1,2-Trichloro-1,2,2-Trifluoroethane | 95.3 | 95.2 | 95.3 |
| | Ethanol | 3.6 | 3.7 | 3.6 |
| | Nitromethane | 1.1 | 1.1 | 1.1 |
| Control | 1,1,2-Trichloro-1,2,2-Trifluoroethane | 93.9 | 92.3 | 95.0 |
| | Ethanol | 5.0 | 6.5 | 4.0 |
| | Nitromethane | 1.0 | 1.2 | 1.0 |
| Control | 1,1,2-Trichloro-1,2,2-Trifluoroethane | 94.5 | 93.7 | 95.1 |
| | Ethanol | 4.3 | 5.2 | 3.9 |
| | Nitromethane | 1.1 | 1.2 | 1.0 |
| Control | 1,1,2-Trichloro-1,2,2-Trifluoroethane | 92.5 | 88.7 | 94.7 |
| | Ethanol | 6.5 | 10.1 | 4.4 |
| | Nitromethane | 1.0 | 1.2 | 0.9 |

EXAMPLE 3

An azeotropic mixture of the present invention was prepared, together with a control mixture which was an azeotropic blend of ethanol and 1,1,2-trichloro-1,2,2-trifluoroethane. The two azeotropic mixtures were tested for their ability to remove flux from circuit boards.

Eight identical circuit boards were fitted with crimped copper wire connections simulating electronic component connections. Commercial activated flux was applied to the circuit side of the boards and cured at 100°C. for 2 minutes. The fluxed side was immersed in freshly skimmed 262°C. molten solder for 5 seconds. After cooling, the boards were totally immersed for four minutes in the boil sump of a laboratory size vapor degreaser containing boiling test liquids. Immediately thereafter the boards were immersed in the rinse sump liquid for 15 seconds, removed and sprayed for 15 seconds on each side with pumped rinse sump liquid, and held for 30 seconds in the vapor zone for final vapor rinsing. The boards were then removed and examined.

Four boards were cleaned with the control mixture of 1,1,2-trichloro-1,2,2-trifluoroethane and ethanol and four boards were cleaned with the azeotropic mixture of the present invention. The control mixture failed to remove small amounts of flux from the wire connections whereas the boards cleaned with the invention mixture were visibly completely clean.

We claim:

1. A minimum boiling point azeotropic composition consisting essentially of about 95.3 weight percent 1,1,-2-trichloro-1,2,2-trifluoroethane, about 3.6 weight percent ethanol, and about 1.1 weight percent nitromethane.

* * * * *